(12) United States Patent
Srikrishnan et al.

(10) Patent No.: US 11,617,957 B2
(45) Date of Patent: Apr. 4, 2023

(54) ELECTRONIC DEVICE FOR PROVIDING INTERACTIVE GAME AND OPERATING METHOD THEREFOR

(71) Applicant: Samsung Electronics Co., Ltd., Suwon-si (KR)

(72) Inventors: Anjana Srikrishnan, Bangalore (IN); Swarna Srimal Mehta, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 22 days.

(21) Appl. No.: 17/295,671

(22) PCT Filed: Dec. 6, 2019

(86) PCT No.: PCT/KR2019/017198
§ 371 (c)(1),
(2) Date: May 20, 2021

(87) PCT Pub. No.: WO2020/116993
PCT Pub. Date: Jun. 11, 2020

(65) Prior Publication Data
US 2022/0008828 A1   Jan. 13, 2022

(30) Foreign Application Priority Data

Dec. 6, 2018 (IN) .............................. 201841046161
Dec. 4, 2019 (IN) .............................. 201841046161

(51) Int. Cl.
*A63F 13/67* (2014.01)
*A63F 13/35* (2014.01)
(Continued)

(52) U.S. Cl.
CPC .............. *A63F 13/67* (2014.09); *A63F 9/183* (2013.01); *A63F 13/35* (2014.09); *A63F 13/45* (2014.09);
(Continued)

(58) Field of Classification Search
None
See application file for complete search history.

(56) References Cited

U.S. PATENT DOCUMENTS 8,684,807 B1 *   4/2014   Crici ...................... A63F 13/92
                                                          434/350
9,117,374 B2 *   8/2015   Nguyen .................. G09B 7/00
(Continued)

FOREIGN PATENT DOCUMENTS

GB      2510442 A     8/2014
JP      2004-016283 A  1/2004
(Continued)

OTHER PUBLICATIONS

Extended European Search Report dated Oct. 25, 2021, issued in European Patent Application No. 19892576.0.

*Primary Examiner* — Ronald Laneau
(74) *Attorney, Agent, or Firm* — Jefferson IP Law, LLP

(57) ABSTRACT

Disclosed is a method, performed by an electronic device, of providing a user with an interactive game, the method including obtaining user data collected with respect to the user, determining a user data type for providing the interactive game, based on the user data, generating a question and choices for the interactive game, based on user data that belongs to the determined user data type, from among the user data, and providing the user with the interactive game including the question and the choices.

18 Claims, 13 Drawing Sheets

(51) Int. Cl.
    *A63F 13/45*     (2014.01)
    *A63F 13/79*     (2014.01)
    *A63F 9/18*     (2006.01)
    *G10L 15/22*     (2006.01)

(52) U.S. Cl.
    CPC ...... *A63F 13/79* (2014.09); *A63F 2300/1075* (2013.01); *A63F 2300/1081* (2013.01); *A63F 2300/8064* (2013.01); *G10L 15/22* (2013.01)

(56) References Cited

U.S. PATENT DOCUMENTS

| | | | |
|---|---|---|---|
| 2014/0128144 A1 | 5/2014 | Bavitz et al. | |
| 2014/0342791 A1* | 11/2014 | Hugh | A63F 13/80 463/9 |
| 2016/0030848 A1* | 2/2016 | Lema | G07F 17/3216 463/9 |

FOREIGN PATENT DOCUMENTS

| | | | |
|---|---|---|---|
| JP | 2011-053992 A | 3/2011 | |
| JP | 2015-195998 A | 11/2015 | |
| KR | 10-2014-0010494 A | 1/2014 | |
| KR | 10-2006-0024290 A | 3/2016 | |
| WO | 2005/086051 A1 | 9/2005 | |
| WO | 2014/179490 A1 | 11/2014 | |
| WO | 2019/066132 A1 | 4/2019 | |

* cited by examiner

1000

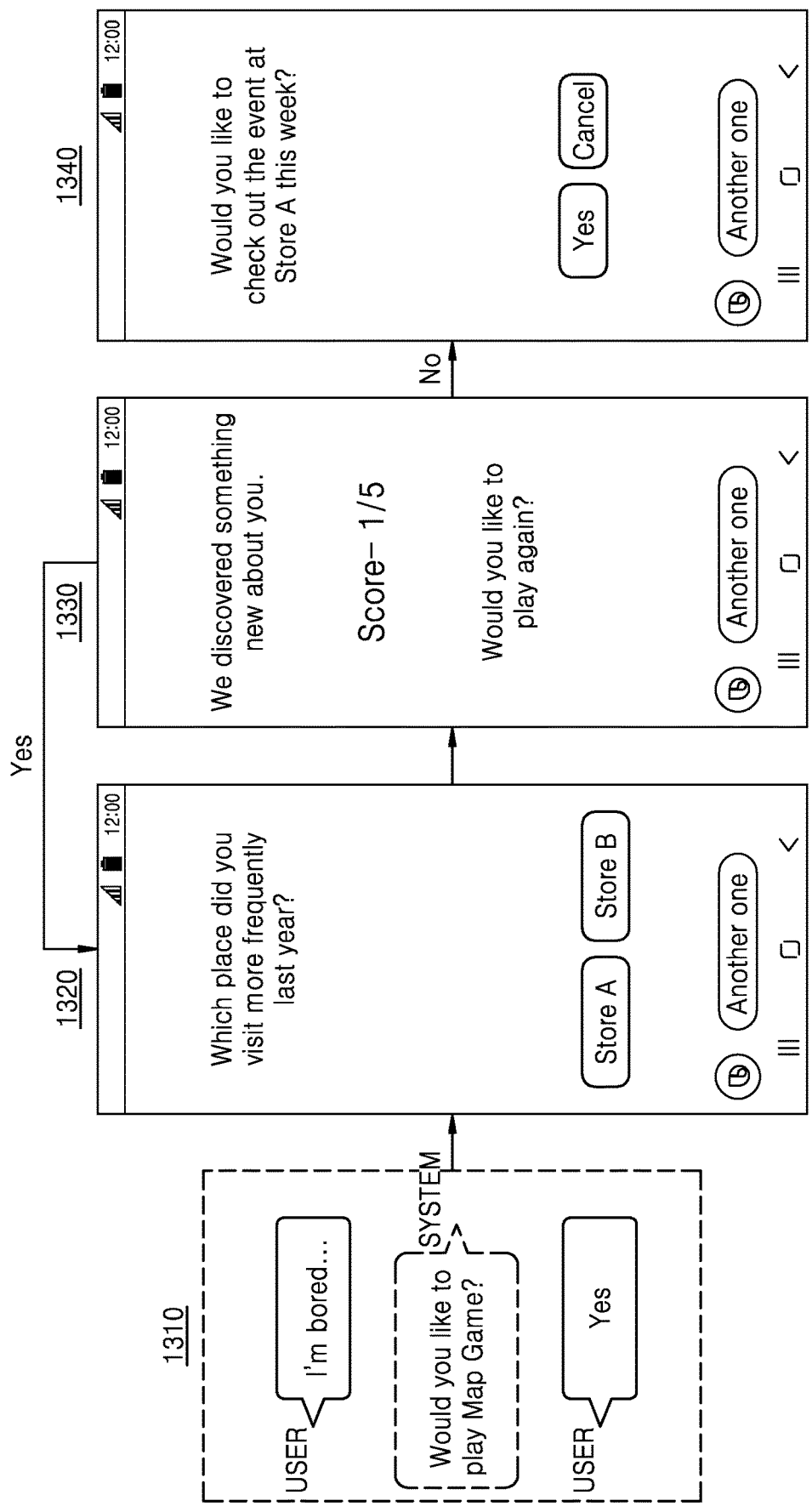

ELECTRONIC DEVICE FOR PROVIDING INTERACTIVE GAME AND OPERATING METHOD THEREFOR

TECHNICAL FIELD

The present disclosure relates to an electronic device for providing an interactive game and an operating method of the same.

BACKGROUND ART

An electronic device may provide a user with various entertainments by using various data items such as questions, jokes, or puzzles. However, because entertainments distributed by a central server are generated without customization, it is difficult for entertainments to attract users' interests.

Therefore, the electronic device needs to provide various types of entertainments customized for a user, by containing information that is more likely to attract the user's interest.

DESCRIPTION OF EMBODIMENTS

Solution to Problem

An aspect of the present disclosure is to provide an electronic device for providing an interactive game and an operating method of the same.

Another aspect of the present disclosure is to provide a computer-readable recording medium having recorded thereon a program for executing the method in a computer. The technical object to be solved is not limited to the above-described technical objects, and other technical objects may exist.

BRIEF DESCRIPTION OF DRAWINGS

FIG. 13 is a diagram illustrating an example of providing an interactive game related to a location, according to an embodiment.

MODE OF DISCLOSURE

Figure 1:
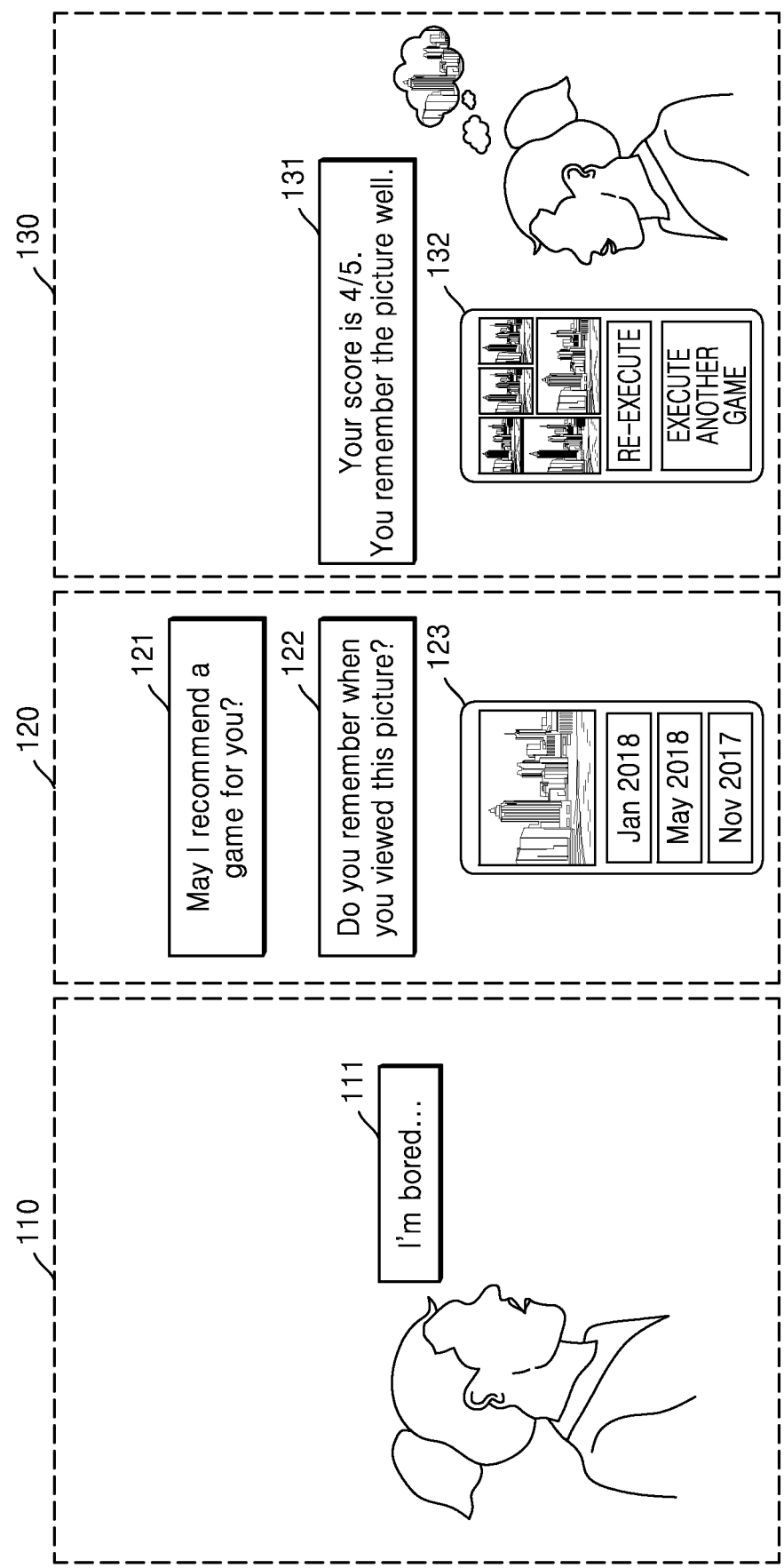
FIG. 1 illustrates an example in which an electronic device provides a user-customized interactive game, according to an embodiment.

According to a first aspect of the present disclosure, there is provided a method, performed by an electronic device, of providing a user with an interactive game, the method including: obtaining user data collected with respect to the user; determining a user data type for providing the interactive game, based on the user data; generating a question and choices for the interactive game, based on user data that belongs to the determined user data type, from among the user data; and providing the user with the interactive game including the question and the choices.

According to a second aspect of the present disclosure, there is provided an electronic device for providing a user with an interactive game, the electronic device including: a user input unit configured to receive a user input for providing the interactive game; at least one processor configured to obtain, in response to the user input being received, user data collected with respect to the user, determine a user data type for providing the interactive game, based on the user data, and generate a question and choices for the interactive game based on user data that belongs to the determined user data type; and an output unit configured to provide the user with the interactive game including the question and the choices.

The user input unit may include at least one of a touchscreen display or a microphone for receiving the user input.

The output unit may include at least one of a display or a speaker for providing the interactive game.

According to a third aspect of the present disclosure, there is provided a computer-readable recording medium having recorded thereon a program for executing the method according to the first aspect.

Hereinafter, embodiments of the present disclosure will be described in detail with reference to the accompanying drawings such that those of skill in the art may easily carry out the present disclosure. The present disclosure may, however, be embodied in many different forms and should not be understood as being limited to the example embodiments set forth herein. In the drawings, parts not related to the present disclosure may not be illustrated for clarity of explanation, and like reference numerals denote like elements.

Throughout the specification, it will be understood that when an element is referred to as being "connected to" another element, it may be "directly connected to" the other element or be "electrically connected to" the other element through an intervening element. In addition, when an element is referred to as "including" a constituent element, other constituent elements may be further included not excluded unless there is any other particular mention on it.

A function related to an artificial intelligence according to the present disclosure may operate via a processor and a memory. The processor may include one or more processors. In this case, the one or more processors may include, for example, a general-purpose processor such as a central processing unit (CPU), an application processor (AP), or a digital signal processor (DSP), a dedicated graphics processor such as a graphics processing unit (GPU), a vision processing unit (VPU), or a dedicated AI processor such as a neural processing unit (NPU). The one or more processors may control input data to be processed according to predefined operation rules or an artificial intelligence model stored in the memory. When the one or more processors are dedicated artificial intelligence processors, the dedicated artificial intelligence processor may be designed with a hardware structure specialized for processing a specific artificial intelligence model.

The predefined operation rules or artificial intelligence model may be generated via a training process. This may refer, for example, to the predefined operation rules or artificial intelligence model set to perform according to desired characteristics (or purposes) being generated by training a basic artificial intelligence model with a learning algorithm that utilizes a large number of training data. The training process may be performed by a device for performing artificial intelligence or a separate server and/or system. Examples of the learning algorithm may include, for example, and without limitation, supervised learning, unsupervised learning, semi-supervised learning, reinforcement learning, or the like, but are not limited thereto.

The artificial intelligence model may include a plurality of neural network layers. Each of the neural network layers may include a plurality of weight values, and may perform a neural network arithmetic operation via an arithmetic operation between an arithmetic operation result of a previous layer and the plurality of weight values. A plurality of weight values in each of the neural network layers may be optimized by a result of training the artificial intelligence model. For example, the plurality of weight values may be refined to reduce or minimize a loss or cost value obtained by the artificial intelligence model during the training process. An artificial neural network may include, for example, a deep neural network (DNN) and may include, for example, a convolutional neural network (CNN), a deep neural network (DNN), a recurrent neural network (RNN), a restricted Boltzmann machine (RBM), a deep belief network (DBN), a bidirectional recurrent deep neural network (BRDNN), deep Q-networks (DQN), or the like, but is not limited thereto.

Hereinafter, the present disclosure will be described in detail with reference to the accompanying drawings.

FIG. 1 illustrates an example in which an electronic device 1000 provides a user-customized interactive game, according to an embodiment.

Referring to FIG. 1, the electronic device 1000 may operate in order of 110, 120, and 130. The electronic device 1000 according to an embodiment may provide a user-customized interactive game.

The electronic device 1000 according to an embodiment may be implemented in various forms. For example, the electronic device 1000 may be, but is not limited to, a digital camera, a smartphone, a laptop computer, a tablet PC, an electronic book terminal, a digital broadcasting terminal, a personal digital assistant (PDA), a portable multimedia player (PMP), a navigation system, an MP3 player, or the like.

The electronic device 1000 may be a wearable device that may be worn by a user. The wearable device may include at least one of an accessory-type device (e.g., a watch, a ring, a cuff band, an ankle band, a necklace, spectacles, and contact lenses), a head-mounted-device (HMD), a textile or garment-integrated device (e.g., electronic garments), a body attachment device (e.g., a skin pad), or a bioimplantable device (e.g., an implantable circuit) but is not limited thereto. Hereinafter, for convenience of description, a case where the electronic device 1000 is a smartphone will be described.

According to an embodiment, the electronic device 1000 may be a device that receives a user input 111 through an interactive interface, and provides the interactive game in response to the user input 111. The interactive interface may be an interface for a user that receives an input (e.g., a voice input or a text input) from the user and provides a response to the input from the user. According to an embodiment, the interactive interface may include, but is not limited to, a virtual assistant, an artificial intelligence assistant, or the like. The virtual assistant or the artificial intelligence assistant may be a software agent that processes a task requested by a user and provides a service specialized for the user.

As illustrated in 110 of FIG. 1, the electronic device 1000 may recognize a user's speech containing an utterance of "I'm bored" (111) spoken by the user. As illustrated in 120 of FIG. 1, the electronic device 1000 may provide the user with an interactive game according to an embodiment, based on a result of recognizing the user's speech.

According to an embodiment, even in a case where an utterance for requesting the interactive game is not clearly identified from the result of recognizing the user's speech, the electronic device 1000 may determine whether to provide the user with the interactive game, based on various pieces of information about the user such as the user's accent, tone, or current state. For example, the electronic device 1000 may determine whether to provide the user with the interactive game, based on the result of recognizing the user's speech, according to whether the user is highly likely to be interested in the interactive game provided by the electronic device 1000.

However, the present disclosure is not limited thereto, and the electronic device 1000 according to an embodiment may provide the user with the interactive game upon receipt of various types of user inputs.

As illustrated in 120 of FIG. 1, based on the user input, the electronic device 1000 according to an embodiment may output a voice or a display screen containing a guide message 121 indicating that an interactive game is being provided.

The electronic device 1000 according to an embodiment may provide the user with an interactive game 123 related to user data stored in the electronic device 1000. For example, the electronic device 1000 may provide the user with the interactive game 123 related to an image among the user data.

The electronic device 1000 according to an embodiment may output a voice containing a question 122 for the interactive game, and display choices 123 for the question on a display. The user according to an embodiment may answer the question 122 of the interactive game by selecting one of the choices 123.

The user data according to an embodiment may include various types of data related to the user generated as the user uses the electronic device 1000 or another external device. For example, the user data may include data related to images captured or stored by the user, data related to a location of the electronic device 1000, data related to contact information stored in the electronic device 1000, information related to applications installed in the electronic device 1000, information related to other external devices connected to the electronic device 1000, or the like.

The other external devices connected to the electronic device 1000 according to an embodiment may be electronic devices that are connected to the electronic device 1000 and thus are ready to transmit information about their states to the electronic device 1000. For example, the external devices may be Internet of Things (IoT) devices such as smart TVs, smart refrigerators, robot cleaners, smart air purifiers, or the like. However, the present disclosure is not limited thereto, and the other external devices connected to the electronic device 1000 may be various types of electronic devices capable of collecting various pieces of information related to the user and transmitting the collected information to the electronic device 1000.

According to an embodiment, the electronic device 1000 may determine a user data type for providing the interactive game, and generate a question and choices for the interactive game based on user data that belongs to the determined user data type from among the user data.

The user data type that may be determined by the electronic device 1000 according to an embodiment may include various types of data such as an image, a location, contact information, a history of use of applications, external device information, or the like. The user data type according to an embodiment may be determined by classifying the user data based on various criteria such as the format, content, or features of each piece of the user data. For example, the user data type may be determined based on a pre-trained artificial intelligent model for extracting the type of a piece of user data. However, the present disclosure is not limited thereto, and various types of data may be determined to be the user data type by the electronic device 1000.

According to an embodiment, from among various types of user data, one that is predicted to attract the user's interest may be determined to be the user data type. For example, when it is determined, based on the user data, that the user is interested in photographing, and image viewing and editing, the electronic device 1000 may determine the user data type to be "Image". Also, the electronic device 1000 may also generate a question and choices based on user data related to "Image".

Accordingly, the electronic device 1000 according to an embodiment may provide an interactive game including information that is likely to attract the user's interest, by providing an interactive game based on the user data type that is predicted to attract the user's interest.

In addition, the question and the choices of the interactive game according to the embodiment may be generated to include the information that is likely to attract the user's interest. For example, at least one of the question or the choices of the interactive game may include information about at least one piece of the user data, which is determined based on a possibility of each piece of the user data attracting the user's interest, from among the user data that belongs to the user data type determined according to an embodiment.

For example, the possibility of each piece of user data attracting the user's interest may be determined based on a history of use of at least one piece of the user data, from among the user data that belongs to the user data type determined according to an embodiment.

As another example, the possibility of each piece of user data attracting the user's interest may be determined based on information related to a behavior pattern of the user that may be determined from at least one piece of the user data, from among the user data that belongs to the user data type determined according to an embodiment.

As illustrated in 130 of FIG. 1, the electronic device 1000 may output a voice or a screen containing a response message 131 in response to the user's answer to the interactive game provided as illustrated in 120 of FIG. 1.

Also, as illustrated in 132 of FIG. 1, the electronic device 1000 according to an embodiment may ask the user whether to re-execute the interactive game, and may re-execute the interactive game according to the user's selection. For example, the electronic device 1000 may ask the user whether to play the interactive game based on a different user data type, or whether to re-execute the interactive game including a different question and choices based on the current user data type (e.g., "Image").

However, the present disclosure is not limited thereto, and the electronic device 1000 may perform various operations according to the user's answer to the interactive game provided as illustrated in 120 of FIG. 1.

Figure 2:
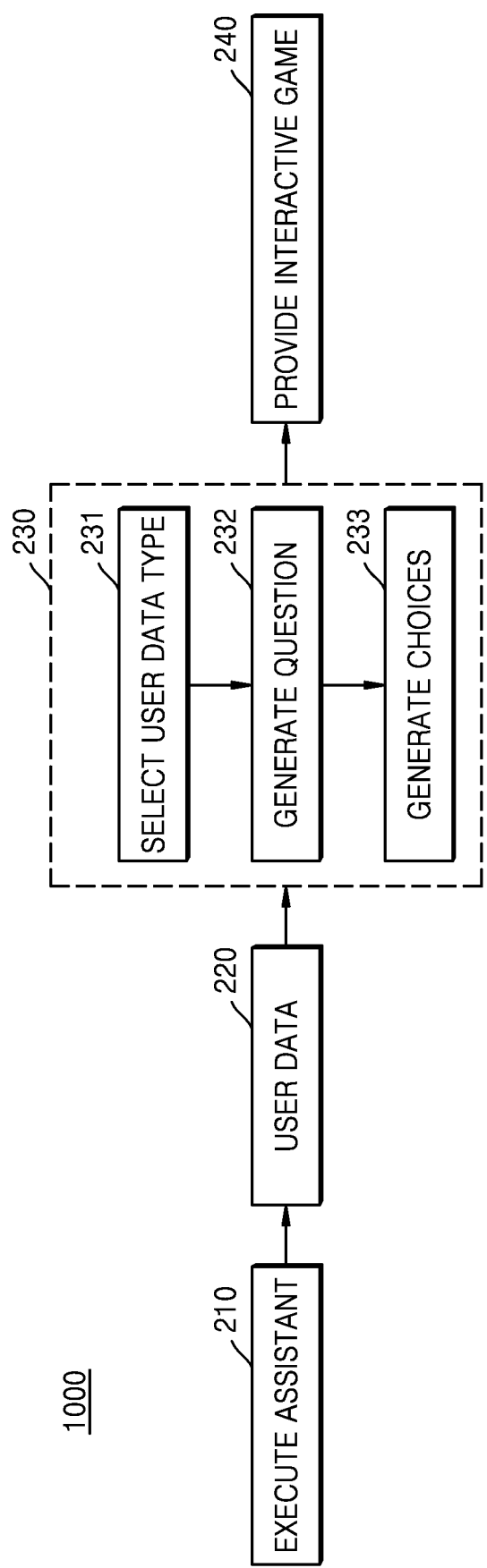
FIG. 2 is a block diagram illustrating an operation of an electronic device providing an interactive game, according to an embodiment.

FIG. 2 is a block diagram illustrating an operation of the electronic device 1000 providing an interactive game, according to an embodiment.

Referring to FIG. 2, the electronic device 1000 according to an embodiment may execute, in operation 210, an assistant for providing an interactive game, obtain, in operation 220, the user data, and provide, in operation 240, an interactive game based on the user data 220. The assistant according to an embodiment may operate according to an interactive interface that receives an input from the user and provides a response to the received input.

In operation 210, the electronic device 1000 may execute the assistant for receiving an input from the user and performing various operations. For example, the electronic device 1000 may execute a voice assistant as a user interface for receiving the user's voice input and outputting a response to the user's voice input.

However, the present disclosure is not limited thereto, and the electronic device 1000 may provide the interactive game according to an embodiment in various schemes such as other user interfaces or other applications, other than executing the assistant.

In operation 220, the electronic device 1000 may obtain the user data for providing the interactive game according to an embodiment, based on the user input received through the assistant executed in operation 210. According to an embodiment, the user data may include various types of data about the user collected by the electronic device 1000.

In operations illustrated in 230 of FIG. 2, the electronic device 1000 may perform an operation of generating a question and choices for providing the interactive game based on the user data collected in operation 220. The operation of generating a question and choices for an interactive game according to an embodiment may include operations of determining a user data type (operation 231) and generating a question (operation 232) and choices (operation 233) according to the determined user data type.

In operation 231, based on the user data, the electronic device 1000 may determine the user data type for providing the interactive game. According to an embodiment, the electronic device 1000 may determine the user data type based on the possibility of each piece of the user data attracting the user's interest.

At least one of the question or the choices of the interactive game according to an embodiment, generated in operations 232 and 233, may include information about at least one piece of the user data, which is determined based on the possibility of each piece of the user data attracting the user's interest. Also, the choices according to an embodiment may be generated according to probabilities of the choices being selected by the user as the answer to the question.

According to an embodiment, whether each piece of the user data is highly likely to attract the user's interest may be determined based on a history of use of the user data. For example, in a case where a preset number of images among the user data have been opened by the user in the last 24 hours, images that have not been opened for a preset period of time or longer (e.g., for 6 months or longer) among images stored in the electronic device 1000 other than those opened in the last 24 hours, may be determined to be user data that is predicted to have a high possibility of attracting the user's interest.

For example, based on the history of use of the user data, the electronic device 1000 may determine that the user is opening a number of images for a certain period of time, to check images that the user has captured in various places. The electronic device 1000 may determine that images captured while the user was traveling to Europe last fall have not been opened for the preset period of time, unlike other images, from among the user data of the electronic device 1000. Accordingly, the electronic device 1000 may predict that the user, checking the images captured in various places, is likely to be interested in the images captured while traveling to Europe last fall. The electronic device 1000 according to an embodiment may generate a question which asks for the date on which the user last opened one of the images captured while traveling to Europe last fall, and choices for the question.

As another example, the electronic device 1000 may determine whether there is a history indicating that messaging, calling, or the like has been performed with respect to at least one contact information item, from among contact information items stored in the electronic device 1000, for a preset number of times, within a preset period of time. According to an embodiment, the user may tend to periodically contact people in the contact information items for improving his/her personal connections. Accordingly, the user may have interest in contact information items that have not been contacted for a long time.

The electronic device 1000 according to an embodiment may determine that contact information items that have not been contacted for a preset period of time or longer (e.g., for 6 months or longer), among the contact information items stored in the electronic device 1000, are user data that is predicted to attract the user's interest the most.

According to an embodiment, whether each piece of the user data is highly likely to attract the user's interest may be determined based on the behavior pattern of the user that may be determined from the user data such as the history of use of the user data or the current state of the user data. The behavior pattern of the user according to an embodiment may include various types of behavior patterns that may be found in the daily life of the user. For example, the behavior pattern of the user may include an act of editing or opening an image stored in the electronic device 1000, an act of using various IoT devices connected to the electronic device 1000, an act of visiting various places (e.g., coffee shops, stores), an act of contacting people through the contact information items stored in the electronic device 1000, or the like.

Accordingly, the electronic device 1000 according to an embodiment may provide the user with information related to the behavior pattern of the user, as an interactive game, thereby inducing the user to perform a beneficial or desirable behavior. In addition, according to an embodiment, information representing the user's own behavior pattern is provided to the user as an interactive game, and thus, the user may have a great interest in the interactive game.

In operation 232, the electronic device 100 may generate the question based on the user data type determined in operation 231. For example, the electronic device 1000 may generate the question related to at least one piece of the user data predicted to attract the user's interest the most, from among the user data that belongs to the user data type determined in operation 231.

According to an embodiment, the question related to the user data may include a question that asks for the user's thoughts.

In operation 233, the electronic device 1000 may generate at least one choice that the user may select, based on the question generated in operation 232. According to an embodiment, the at least one choice may be generated according to whether a probability of the user selecting each choice is high, and based on the user data.

For example, because it is highly likely that, on the return flight, the user has opened the images captured while traveling to Europe, the electronic device 1000 may determine that the user is highly likely to select, as an answer to the question, a choice indicating a date close to the boarding date of the return flight. Accordingly, the electronic device 1000 may generate a choice "Last fall" that includes the boarding date of the return flight, for the question.

However, the present disclosure is not limited thereto, and the electronic device 1000 may generate various types of choices that are likely to be selected as an answer by the user, by using various methods.

In operation 240, the electronic device 1000 may provide the user with the interactive game by outputting the question and the choices generated in operations 232 and 233. According to an embodiment, as the interactive game includes the question and the choices related to the user data type determined based on the user data, the user may be provided with the interactive game including information predicted to attract the user's interest considering his/her situation.

The electronic device 1000 according to an embodiment may additionally perform an operation related to the user data based on at least one choice selected by the user with respect to the interactive game. The electronic device 1000 according to an embodiment may additionally perform an operation that is predicted to attract the user's interest, based on the choice selected by the user. For example, in a case where the user has selected the choice "February 2018", as an answer to the question of the provided interactive game that asks for the date of opening the presented image, the electronic device 1000 may display images that were opened by the user in February 2018 according to a user input.

Figure 3:
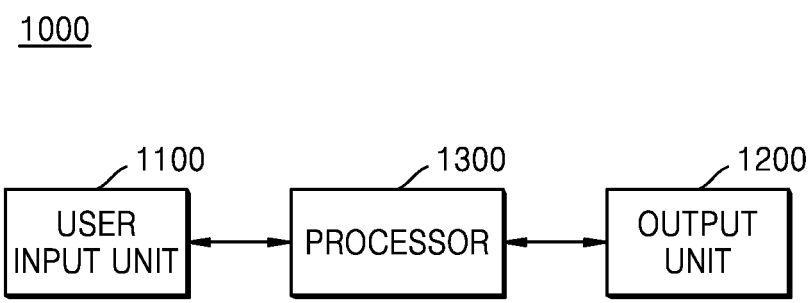
FIG. 3 is a block diagram illustrating an internal configuration of an electronic device, according to an embodiment.

FIG. 3 is a block diagram illustrating an internal configuration of the electronic device 1000, according to an embodiment.

Figure 4:
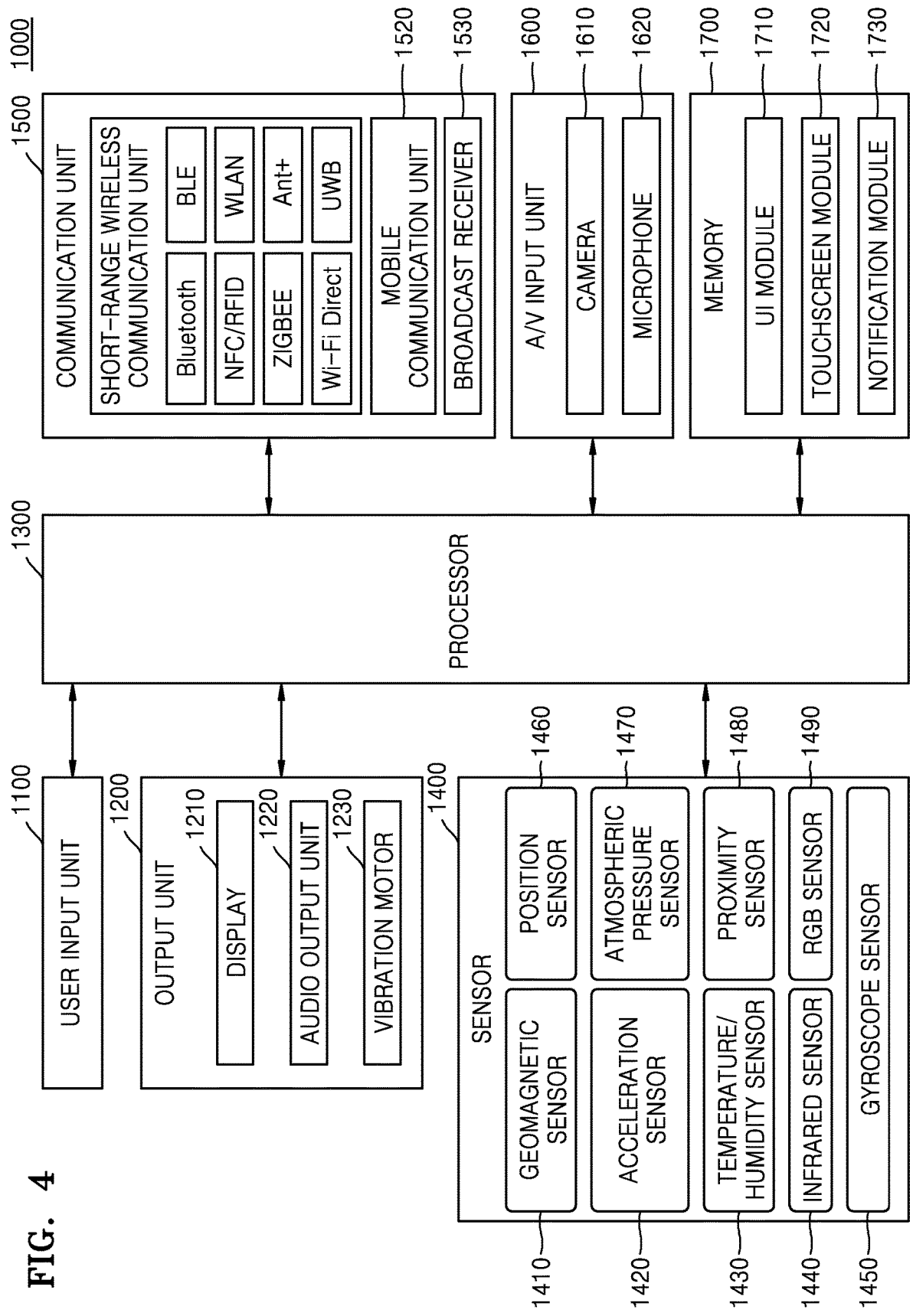
FIG. 4 is a block diagram illustrating an internal configuration of an electronic device, according to an embodiment.

FIG. 4 is a block diagram illustrating an internal configuration of the electronic device 1000, according to an embodiment.

Referring to FIG. 3, the electronic device 1000 may include a processor 1300, a user input unit 1100, and an output unit 1200. However, all components shown in FIG. 3 are not essential components of the electronic device 1000. The electronic device 1000 may be implemented by more components than the components shown in FIG. 3, or by fewer components than the components shown in FIG. 3.

For example, as illustrated in FIG. 4, the electronic device 1000 according to an embodiment may further include a communication unit 1500, a sensor 1400, an A/V input unit 1600, and a memory 1700, in addition to the processor 1300, the user input unit 1100, and the output unit 1200.

The user input unit 1100 is via which a user inputs data for controlling the electronic device 1000. For example, the user input unit 1100 may include, but is not limited to, a key pad, a dome switch, a touch pad (e.g., a touch-type capacitive touch pad, a pressure-type resistive overlay touch pad, an infrared sensor-type touch pad, a surface acoustic wave conduction touch pad, an integration-type tension measurement touch pad, a piezoelectric effect-type touch pad), a jog wheel, a jog switch, etc.

According to an embodiment, the user input unit 1100 may receive a user input for the electronic device 1000 to provide an interactive game. For example, the electronic device 1000 may provide an interactive game or obtain the user's answer to the provided interactive game based on a user input received through a keypad, a touch pad, or the like of the user input unit 1100.

The output unit 1200 may output an audio signal, a video signal, or a vibration signal, and the output unit 1200 may include a display 1210, an audio output unit 1220, and a vibration motor 1230.

The display 1210 may display information processed by the electronic device 1000. According to an embodiment, the display 1210 may output an interactive game generated based on the user data.

In a case where the display 1210 and a touchpad form a layer structure and thus constitute a touchscreen, the display 1210 may also be used as an input device in addition to being used as an output device. The display 1210 may include at least one of a liquid crystal display, a thin film transistor-liquid crystal display, an organic light-emitting diode display, a flexible display, a three-dimensional (3D) display, or an electrophoretic display. The electronic device 1000 may include two or more displays 1210 according to an implementation of the electronic device 1000.

The audio output unit 1220 may output audio data received from the communication unit 1500 or stored in the memory 1700. According to an embodiment, the sound output unit 1220 may output audio data necessary for providing an interactive game based on the user data. For example, the sound output unit 1220 may output audio data including a message for providing an interactive game through the voice assistant.

The vibration motor 1230 may output a vibration signal. The vibration motor 1230 may also output a vibration signal when a touch is input to the touchscreen. According to an embodiment, the vibration motor 1230 may output a vibration signal including a message for providing an interactive game.

The processor 1300 may control the overall operation of the electronic device 1000. For example, the processor 1300 may generally control the user input unit 1100, the output unit 1200, the sensor 1400, the communication unit 1500, the A/V input unit 1600, and the like, by executing programs stored in the memory 1700.

The electronic device 1000 may include at least one processor 1300. For example, the electronic device 1000 may include various types of processors such as a central processing unit (CPU), a graphics processing unit (GPU), or a neural processing unit (NPU).

The processor 1300 may be configured to process commands of a computer program by performing basic arithmetic, logic, and input/output operations. The commands may be provided from the memory 1700 to the processor 1300, or may be received through the communication unit 1500 and provided to the processor 1300. For example, the processor 1300 may be configured to execute the commands according to program code stored in a recording device such as a memory.

The processor 1300 according to an embodiment may determine the user data type for providing the interactive game based on the user data, and generate the question and the choices for the interactive game based on user data that belongs to the determined user data type, among the user data.

The processor 1300 according to an embodiment may generate the question and the choices based on the user data that is predicted to have a high possibility of attracting the user's interest, from among the user data that belongs to the determined user data type. Accordingly, the user according to an embodiment may be provided with the interactive game including information that is likely to attract the user's interest.

The sensor 1400 may detect the state of the electronic device 1000 or the state of the periphery of the electronic device 1000, and may transmit the detected information to the processor 1300.

The sensor 1400 may include at least one of a geomagnetic sensor 1410, an acceleration sensor 1420, a temperature/humidity sensor 1430, an infrared sensor 1440, a gyroscope sensor 1450, a position sensor (e.g., a GPS) 1460, an atmospheric pressure sensor 1470, a proximity sensor 1480, or an RGB sensor (illuminance sensor) 1490, but is not limited thereto.

The user data according to an embodiment may include information detected by the sensor 1400. For example, the user data may include location information of the electronic device 1000 detected by the sensor 1400.

The communication unit 1500 may include one or more components for allowing the electronic device 1000 to communicate with a server (not shown) or an external device (not shown). For example, the communication unit 1500 may include a short-range wireless communication unit 1510, a mobile communication unit 1520, and a broadcast receiver 1530.

The short-range wireless communication unit 1510 may include, but is not limited to, a Bluetooth communication unit, a Bluetooth Low Energy (BLE) communication unit, a near field communication (NFC) unit, a WLAN (Wi-Fi) communication unit, a Zigbee communication unit, an Infrared Data Association (IrDA) communication unit, a Wi-Fi Direct (WFD) communication unit, an ultra wideband (UWB) communication unit, an Ant+ communication unit, or the like.

The mobile communication unit 1520 may transmit and receive a wireless signal to and from at least one of a base station, an external terminal, or a server on a mobile communication network. Here, the wireless signals may include various types of data based on transmission and reception of voice call signals, video call signals, or text/multimedia messages.

The broadcast receiver 1530 may receive a broadcast signal and/or broadcast-related information from the outside through a broadcast channel The broadcast channels may include satellite channels and terrestrial channels. According to an embodiment, the electronic device 1000 may not include the broadcast receiver 1530.

According to an embodiment, the communication unit 1500 may receive information for obtaining the user data from an external device. For example, based on information about the state of the external device received by the communication unit 1500, the information about the state of the external device used by the user may be obtained from the user data.

The A/V (audio/video) input unit 1600 is via which an audio signal or a video signal is input, and may include a camera 1610, a microphone 1620, and the like. The camera 1610 may operate in a video call mode or a photographing mode to obtain an image frame such as a still image or a moving image by using an image sensor. An image captured by the image sensor may be processed by the processor 1300 or a separate image processor (not shown).

An image or audio signal captured by the A/V input unit 1600 according to an embodiment may be obtained as the user data. For example, images captured by the A/V input unit 1600 may be obtained as the user data, and an interactive game generated based on the user data related to the images may be provided to the user.

The microphone 1620 may receive an external audio signal, and process the received audio signal into electrical voice data. For example, the microphone 1620 may receive the user's voice input for providing the interactive game.

The memory 1700 may store a program for processing and controlling the processor 1300, and may store data input to or output from the electronic device 1000.

The memory 1700 according to an embodiment may store various types of user data.

The memory 1700 may include at least one of a flash memory type, a hard disk type, a multimedia card micro type, card-type memory (e.g., SD or XD memory), random access memory (RAM), static random access memory (SRAM), read-only memory (ROM), electrically erasable programmable read-only memory (EEPROM), programmable read-only memory (PROM), magnetic memory, a magnetic disc, or an optical disc.

Programs stored in the memory 1700 may be classified into a plurality of modules according to their functions, for example, into a user interface (UI) module 1710, a touchscreen module 1720, and a notification module 1730.

The UI module 1710 may provide a specialized user interface or graphical user interface, or the like that interworks with the electronic device 1000, for each application. The touchscreen module 1720 may detect a touch gesture input on a touchscreen by the user, and may transmit information about the touch gesture to the processor 1300. The touchscreen module 1720 according to some embodiments may recognize and analyze touch code. The touchscreen module 1720 may be configured as separate hardware including a controller.

In order to detect a touch or a proximity touch on the touchscreen, various sensors may be provided inside or near the touchscreen. An example of the sensors for detecting a touch on the touchscreen may include a tactile sensor. The tactile sensor detects a contact of a particular object to a degree greater than or equal to the degree to which a human detects a touch. The tactile sensor may detect various pieces of information including the roughness of a contact surface, the rigidity of a contact object, or the temperature of a contact point.

A user's touch gesture may include tap, touch and hold, double-tap, drag, panning, flick, drag and drop, swipe, or the like.

The notification module 1730 may generate a signal for notifying of the occurrence of an event in the electronic device 1000.

Figure 5:
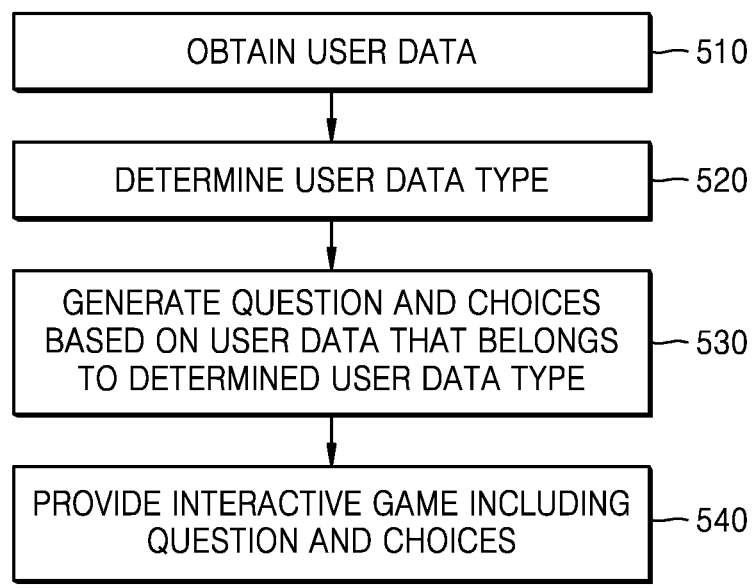
FIG. 5 is a flowchart illustrating a method, performed by an electronic device, of providing an interactive game, according to an embodiment.

FIG. 5 is a flowchart illustrating a method, performed by the electronic device 1000, of providing an interactive game, according to an embodiment.

Referring to FIG. 5, in operation 510, the electronic device 1000 may obtain the user data collected with respect to the user.

The user data according to an embodiment may further include information about a history of use of each piece of the user data. Also, the user data according to an embodiment may further include information related to the behavior pattern of the user related to the usage history.

For example, image data among the user data may include information about a history of editing or opening of images performed by the user. Contact information data among the user data may include information about a history of contacting (e.g., messaging or calling) performed with respect to each contact information item. Data about the external devices among the user data may include state information of other external devices (e.g., IoT devices) connected to the electronic device 1000 and information about a history of use of each external device by the user. Location information among the user data may include location information of the electronic device 1000 for each time slot. Information about applications among the user data may include information about a history of use of the applications by the user on the electronic device 1000 or other external devices (e.g., IoT devices) connected to the electronic device 1000.

However, the present disclosure is not limited thereto, and the user data that may be collected by the electronic device 1000 according to an embodiment may include various types of data collected with respect to the user and information about the history of use of each piece of the user data and the behavior pattern.

In operation 520, the electronic device 1000 may determine the user data type for providing the interactive game, based on the user data obtained in operation 510. The determined user data type according to an embodiment may be a type that is predicted to attract the user's interest the most.

According to an embodiment, a prediction model for determining a user data type may be trained and stored in the electronic device 1000 in advance. The electronic device 1000 according to an embodiment may determine the user data type that is predicted to attract the user's interest the most, by inputting the user data obtained in operation 510 to the stored prediction model.

However, the determination of the user data type is not limited to the embodiment using the prediction model, and the electronic device 1000 may determine the user data type for providing the interactive game by using various methods.

In operation 530, the electronic device 1000 may generate the question and the choices for the interactive game based on the user data that belongs to the user data type determined in operation 520 among the user data obtained in operation 510.

The question for the interactive game according to an embodiment may be generated to include information that is predicted to have a high possibility of attracting the user's interest.

The choices for the interactive game may be determined according to the probabilities of the choices being selected by the user as the answer to the question. For example, the choices may be determined according to how likely the choices are to be selected by the user as the answer to the question.

According to an embodiment, a prediction model for generating a question and choices for an interactive game may be trained and stored in the electronic device 1000 in advance. The electronic device 1000 according to an embodiment may generate the question and the choices for the interactive game by inputting the user data obtained in operation 510 and information about the user data type determined in operation 520 into the stored prediction model.

According to an embodiment, the prediction models for determining the user data type for the interactive game and generating the question and the choices for the interactive game may be artificial intelligence models based on neural networks, such as deep neural networks (DNNs) or recurrent neural networks (RNNs).

According to an embodiment, a prediction model for determining a user data type for an interactive game, a prediction model for generating a question, and a prediction model for generating choices may be provided, and the electronic device 1000 may provide an interactive game based on each prediction model. However, the present disclosure is not limited thereto, and the determination of the user data type for the interactive game in operation 520 and the generation of the question and the choices in operation 530 may be performed, by using one prediction model, based on the user data collected in operation 510. Alternatively, the interactive game may be provided by using two prediction models, one for determining the user data type for the interactive game and another one for generating the question and the choices.

In operation S540, the electronic device 1000 may provide the user with the interactive game including the question and the choices generated in operation S530. The electronic device 1000 according to an embodiment may receive an input for selecting at least one choice as the answer to the interactive game.

The electronic device 1000 according to an embodiment may update at least one prediction model for determining a user data type and generating a question and choices for an interactive game, based on a user input. For example, based on the user input, the at least one prediction model may be updated such that the user data type may be determined based on the possibility of each piece of the user data attracting the user's interest, and the question and the choices may be generated to include information that is likely to attract the user's interest.

In addition, the electronic device 1000 according to an embodiment may additionally perform an operation related to the user data based on the user input. For example, based on the user input, the electronic device 1000 may determine the operation related to the user data that is likely to be performed by the user, and perform the operation according to the user's permission on the determined operation.

According to an embodiment, the operation that may be additionally performed after the interactive game may be determined based on a prediction model for determining an operation that is predicted to be performed by the user. According to an embodiment, the user's answer to the interactive game may be input to the prediction model, and thus the prediction model may determine the operation that is predicted to be performed by the user. However, the present disclosure is not limited thereto, and the electronic device 1000 may determine the operation that may be additionally performed by using various methods.

Figure 6:
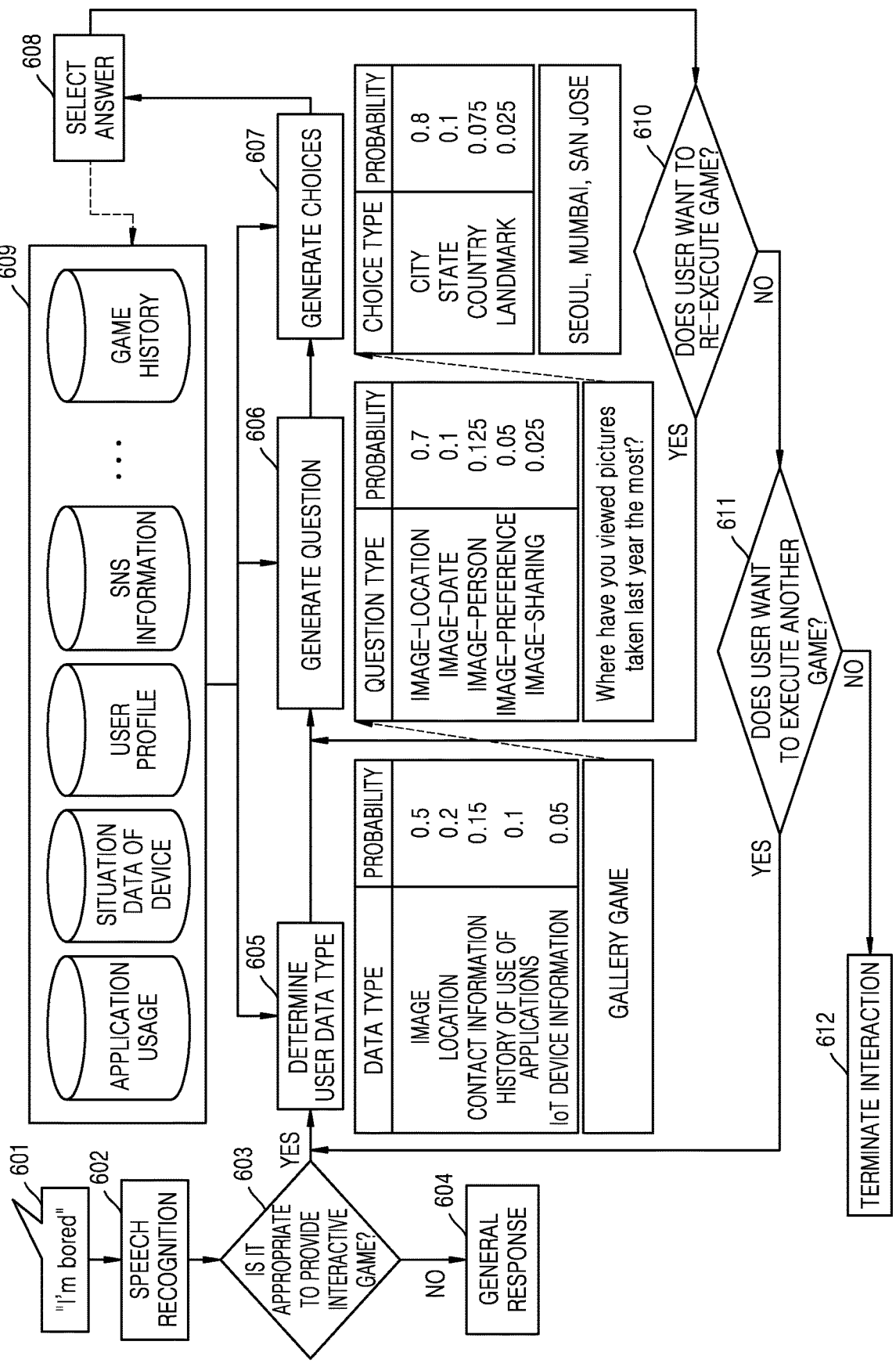
FIG. 6 is a block diagram illustrating an example of executing an interactive game, according to an embodiment.

FIG. 6 is a block diagram illustrating an example of executing an interactive game, according to an embodiment.

Referring to FIG. 6, the electronic device 1000 may receive a voice signal containing an utterance of "I'm bored" spoken by the user in operation 601, and perform speech recognition on the received voice signal in operation 602.

In operation 603, the electronic device 1000 may determine whether to perform the interactive game based on a result of the speech recognition. However, the present disclosure is not limited thereto, and the electronic device 1000 according to an embodiment may determine whether the user is likely to have an interest in the interactive game, without performing the speech recognition, and provide the user with the interactive game according to an embodiment. For example, the electronic device 1000 may determine whether to provide the interactive game, based on various pieces of information about the user such as a voice signal of the user, schedule information of the user, a current location of the user, or the like.

In a case where the electronic device 1000 has determined that it is not appropriate to provide the user with the interactive game, in operation 604, the electronic device 1000 may output a general response based on the result of the speech recognition, based on the determination made in operation 603. For example, in a case where the electronic device 1000 has determined that the user is not interested in the interactive game or does not want to play the interactive game, the electronic device 1000 may not provide the user with the interactive game.

In operation 605, the electronic device 1000 may determine the user data type for the interactive game based on the user data 609.

The user data 609 according to an embodiment may include various pieces of user-related data such as a history of use of applications, data related to a situation of the electronic device 1000, a user profile, social network service (SNS) information, or the like. The user data 609 may further include information related to a history of the interactive game performed according to an embodiment.

According to an embodiment, a value representing a probability of each type of the user data of attracting the user's interest may be determined according to the prediction model. For example, the electronic device 1000 may determine the user data type to be "Image" according to the probabilities determined by the prediction model. According to an embodiment, as the user data type has been determined to be "Image", a gallery game, which is an interactive game related to "Image", may be provided to the user.

In operation 606, the electronic device 1000 may generate the question based on the user data type determined in operation 605 and the user data 609. According to an embodiment, a value representing a probability of each question type of attracting the user's interest may be determined according to the prediction model for generating a question. For example, the electronic device 1000 may determine a question type to be "Image-related location" according to the probabilities determined by the prediction model. According to an embodiment, as the question type is determined to be "Image-related location", the question of "Where have you viewed pictures taken last year the most?", which includes content related to "Image-related location" may be generated for the interactive game.

However, the present disclosure is not limited thereto, and various types of questions may be generated according to various methods.

In operation 607, the electronic device 1000 may generate at least one choice, which the user may select as an answer in the interactive game, based on the question generated in operation 606 and the user data 609. According to an embodiment, a value representing a probability of each choice type of attracting the user's interest may be determined according to the prediction model for generating choices. For example, the electronic device 1000 may determine a choice type to be "City" according to the probabilities determined by the prediction model. According to an embodiment, as the choice type has been determined to be "City", choices "Seoul", "Mumbai", "San Jose", and the like, that belong to "City", may be generated for the interactive game.

However, the present disclosure is not limited thereto, and various types of choices may be generated according to various methods.

In operation 608, the electronic device 1000 may receive a user input for selecting at least one of the choices generated in operation 607. The electronic device 1000 according to an embodiment may update the history of the interactive game included in the user data 609, based on the user's answer.

In addition, according to an embodiment, the prediction models for the interactive game may be updated based on the updated history of the interactive game. According to an embodiment, based on the updated prediction models, the user data type may be determined, the question and the choices may be generated, and accordingly, the interactive game in which the user's answer of operation 608 is reflected may be provided to the user.

In operations 610 and 611, the electronic device 1000 may re-execute the interactive game for the same user data type, or execute the interactive game for another user data type according to a user input. Furthermore, in operation 612, the providing of the interactive game according to an embodiment may be terminated according to a user input.

Figure 7:
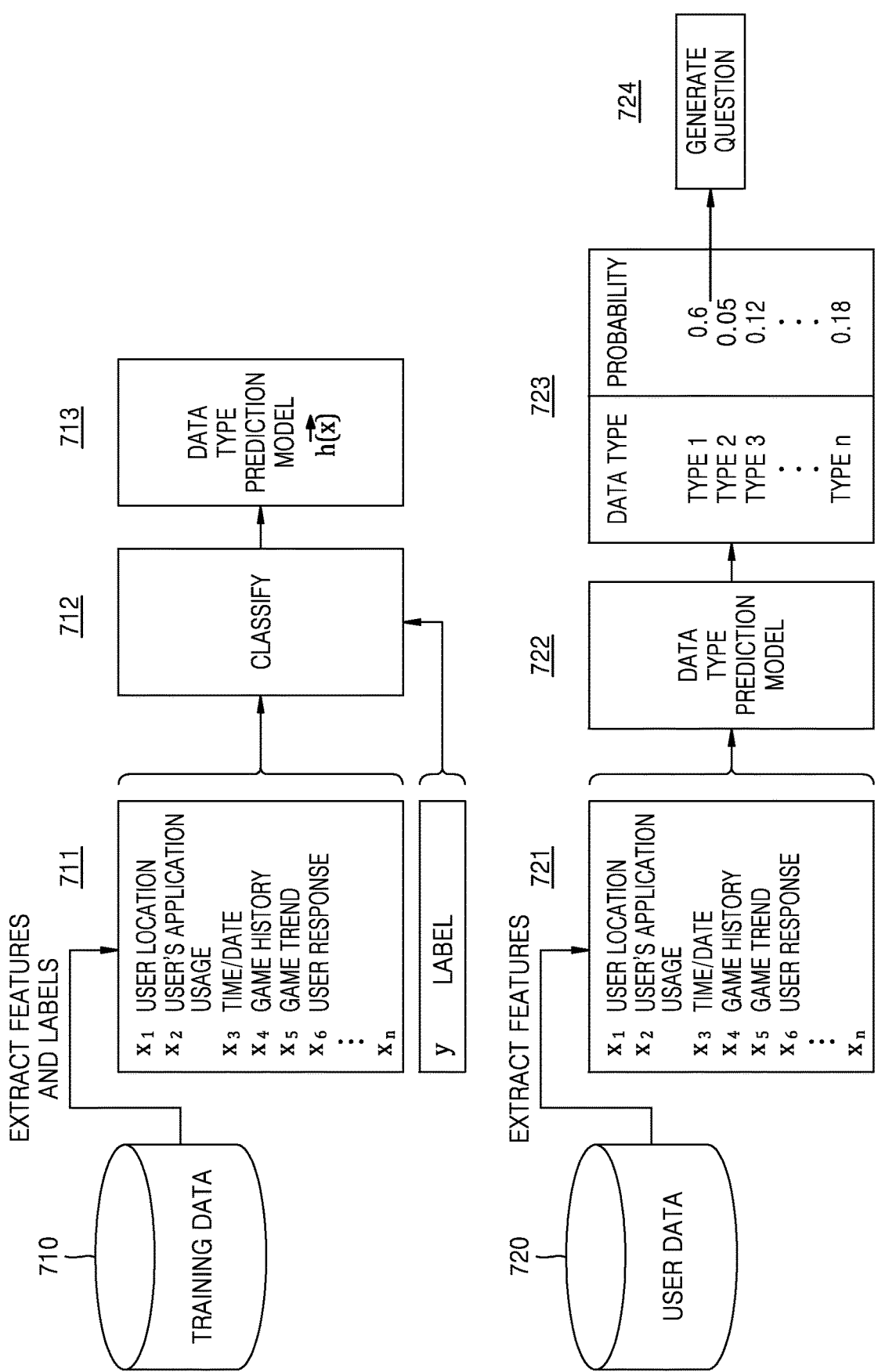
FIG. 7 is a diagram illustrating an example of a prediction model for predicting a type of user data, according to an embodiment.

FIG. 7 is a diagram illustrating an example of a prediction model for predicting a type of user data, according to an embodiment.

Referring to FIG. 7, in operations 711 to 713, the electronic device 1000 may train the prediction model for predicting a type of user data, based on training data 710 for training the prediction model.

In operation 711, the electronic device 1000 may analyze the training data 710, to extract features $x_1$ to $x_n$ of each piece of data included in the training data 710 and at least one label y for classifying the features.

The training data 710 according to an embodiment is data required to train the prediction model, and may include various types of user data collected by using various methods. The training data 710 according to an embodiment may be user data collected for training the prediction model.

Also, the training data 710 may include user data collected with respect to another user having a tendency similar to that of the user. Accordingly, even in a case where the user data is insufficient, the prediction model may be sufficiently trained.

However, the present disclosure is not limited thereto, and the training data 710 according to an embodiment may include various types of data collected by the electronic device 1000 or other external devices by using various methods.

The features of the data according to an embodiment may be extracted from the training data 710 by using various types of training models for extracting features from data. However, the present disclosure is not limited thereto, and the features of the data may be extracted by using various methods.

The extracted features of the data according to an embodiment may include, but are not limited to, various types of features, such as a location of the user, a history of use of applications including timestamps, the history of the interactive game, the trend related to the interactive game, or the like.

The at least one label y according to an embodiment is used to classify the features extracted from the training data 710 according to various criteria, and may be extracted from the training data 710 by using various types of training models for determining a label. For example, the at least one label may be determined such that similar features may be classified into one label. However, the present disclosure is not limited thereto, and the at least one label may be extracted by using various methods.

The at least one label according to an embodiment may correspond to the user data type. Therefore, the user data type may be determined by determining a probability for each label according to the prediction model.

In operation 712, the electronic device 1000 may match the features determined in operation 711 to the at least one label, to classify the features extracted from the training data 710 according to the at least one label.

In operation 713, the prediction model for determining a user data type may be generated based on the classified features. As features of user data that are matched to each label are determined, and a probability for each label being preferred by the user or attracting the user's interest is determined, the prediction model according to an embodiment may be generated, such that the user data type that is preferred by the user or that attracts the user's interest may be determined.

The electronic device 1000 according to an embodiment may determine the user data type for the interactive game in operations 721 to 723 based on the user data 720. According to an embodiment, at least one feature $x_1$ to $x_n$ extracted from the user data 720 may be input to the prediction model, and thus, each label and the probability of the label may be determined.

In operation 721, the electronic device 1000 may extract the at least one feature $x_1$ to $x_n$ from the user data 720. The features $x_1$ to $x_n$ according to an embodiment may be extracted from the user data 720 by using various types of training models for extracting features from data.

In operation 722, the electronic device 1000 may predict a user data type that is likely to be preferred by the user, by obtaining a probability for each user data type as illustrated in operation 723, based on the prediction model trained in operation 713. For example, a user data type having a high probability may be determined to be highly likely to attract the user's interest.

As illustrated in 723, the probability of Type 1 may be determined to be the highest probability, and accordingly, in operation 724, the electronic device 1000 according to an embodiment may generate the question for providing the interactive game based on Type 1.

Figure 8:
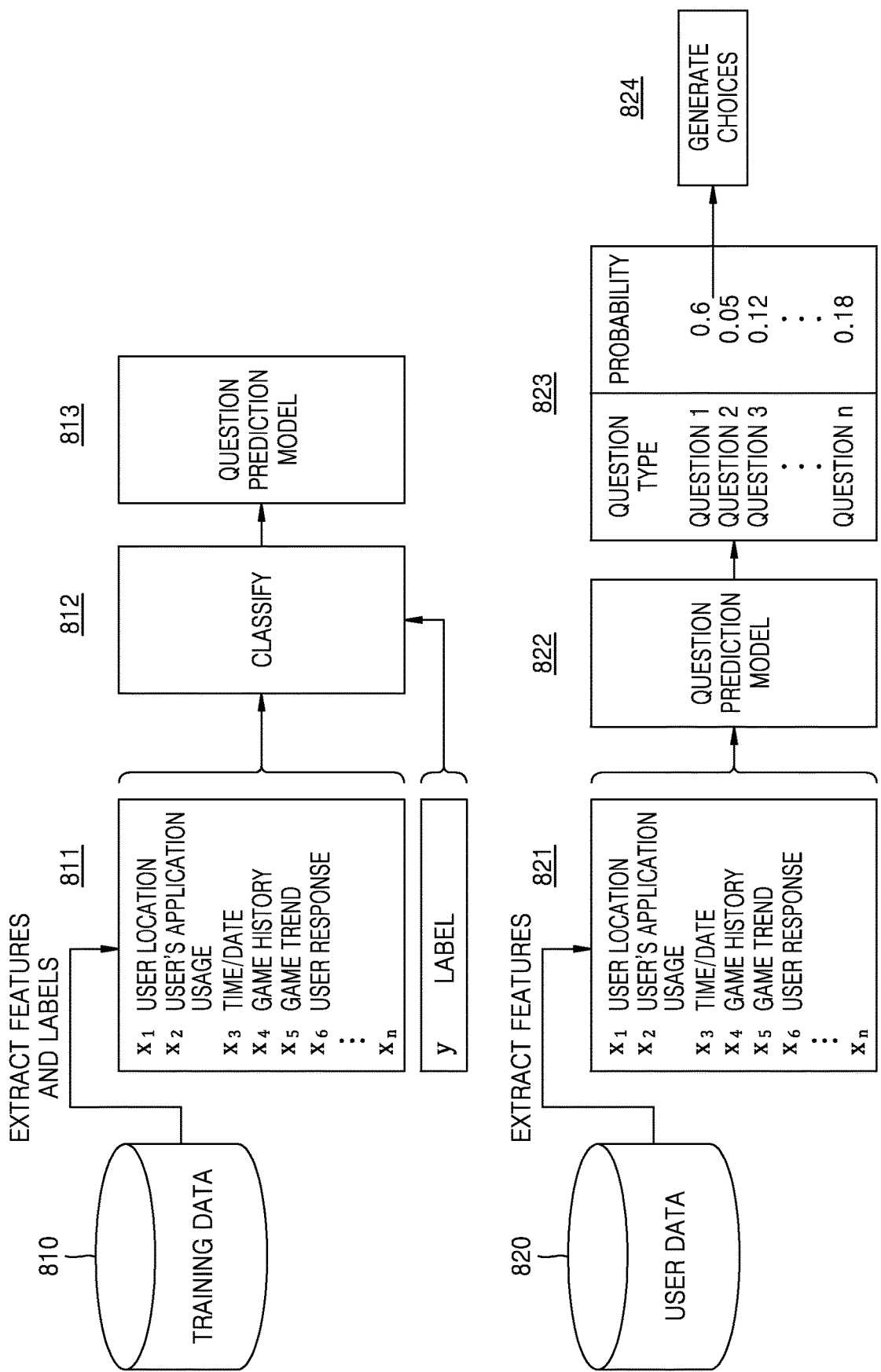
FIG. 8 is a diagram illustrating an example of a prediction model for generating a question, according to an embodiment.

FIG. 8 is a diagram illustrating an example of a prediction model for generating a question, according to an embodiment.

Referring to FIG. 8, in operations 811 to 813, the electronic device 1000 may train the prediction model based on training data 810 for training the prediction model.

In operation 811, the electronic device 1000 may analyze the training data 810, to extract features $x_1$ to $x_n$ of each piece of data included in the training data 810 and at least one label y for classifying the features.

The training data 810 according to an embodiment is data required to train the prediction model, and may include various types of user data collected by using various methods. The training data 810 according to an embodiment may be user data collected for training the prediction model.

Also, the training data 810 may include user data collected with respect to another user having a tendency similar to that of the user. Accordingly, even in a case where the user data is insufficient, the prediction model may be sufficiently trained.

However, the present disclosure is not limited thereto, and the training data 810 according to an embodiment may include various types of data collected by the electronic device 1000 or other external devices by using various methods.

The features of the data according to an embodiment may be extracted from the training data 810 by using various types of training models for extracting features from data. However, the present disclosure is not limited thereto, and the features of the data may be extracted by using various methods.

The extracted features of the data according to an embodiment may include, but are not limited to, various types of features, such as a location of the user, a history of use of applications including timestamps, the history of the interactive game, the trend related to the interactive game, or the like.

The at least one label y according to an embodiment is used to classify the features extracted from the training data 810 according to various criteria, and may be extracted from the training data 810 by using various types of training models for determining a label. For example, the at least one label may be determined such that similar features may be classified into one label. However, the present disclosure is not limited thereto, and the at least one label may be extracted by using various methods.

The at least one label according to an embodiment may correspond to the user data type. Therefore, a probability of each label may be determined according to the prediction model, thus, the question type may be determined, and the question may be determined based on the determined question type. However, the present disclosure is not limited thereto, and as the user data and the user data type are input to the prediction model, a complete question may be output, without the determination of the question type.

In operation 812, the electronic device 1000 may match the features determined in operation 811 to the at least one label, to classify the features extracted from the training data 810 according to the at least one label.

In operation 813, a prediction model for determining a question type may be generated based on the classified features. As features of user data that are matched to each label are determined, and a probability for each label being preferred by the user or attracting the user's interest is determined, the prediction model according to an embodiment may be generated, such that the question type that is preferred by the user or that attracts the user's interest may be determined.

Furthermore, the probability of each label according to an embodiment may be determined not only based on the training data 810, but also according to the user data type that may be determined by using the prediction model of FIG. 7, such that the question type that is highly likely to be preferred by the user or attract the user's interest may be determined. For example, the probability of each label may be determined based on information related to a history of use of the user data or a behavior pattern, such that the question type that is highly likely to be preferred by the user or attract the user's interest may be determined.

The electronic device 1000 according to an embodiment may determine the question type for the interactive game in operations 821 to 823 based on the user data 820. According to an embodiment, at least one feature $x_1$ to $x_n$ extracted from the user data 820 may be input to the prediction model, and thus, each label and the probability of the label may be determined.

In operation 821, the electronic device 1000 may extract the at least one feature $x_1$ to $x_n$ from the user data 820. The features $x_1$ to $x_n$ according to an embodiment may be extracted from the user data 820 by using various types of training models for extracting features from data.

According to an embodiment, as the features extracted in operation 821 and the user data type determined by using the prediction model of FIG. 7 is input to the prediction model for determining a question, a probability for each question type may be obtained as illustrated in operation 823.

In operation 822, the electronic device 1000 may predict a question type that is likely to be preferred by the user, by obtaining a probability for each question type as illustrated in operation 823, based on the prediction model trained in operation 813. For example, a question type having a high probability may be determined to be highly likely to attract the user's interest.

As illustrated in 823, the probability of Question 1 may be determined to be the highest probability, and accordingly, in operation 823, the electronic device 1000 according to an embodiment may generate the question for providing the interactive game based on Question 1.

In operation 824, the electronic device 1000 may generate the choices based on the question type determined by using the prediction model for determining a question. Similar to the generation of the question, the choices according to an embodiment may be generated by using the prediction model for generating choices. For example, the prediction model for generating choices may be trained based on the training data, and the choices may be generated by inputting, to the trained prediction model for generating choices, the user data and the question type determined by using the prediction model for generating a question.

Figure 9:
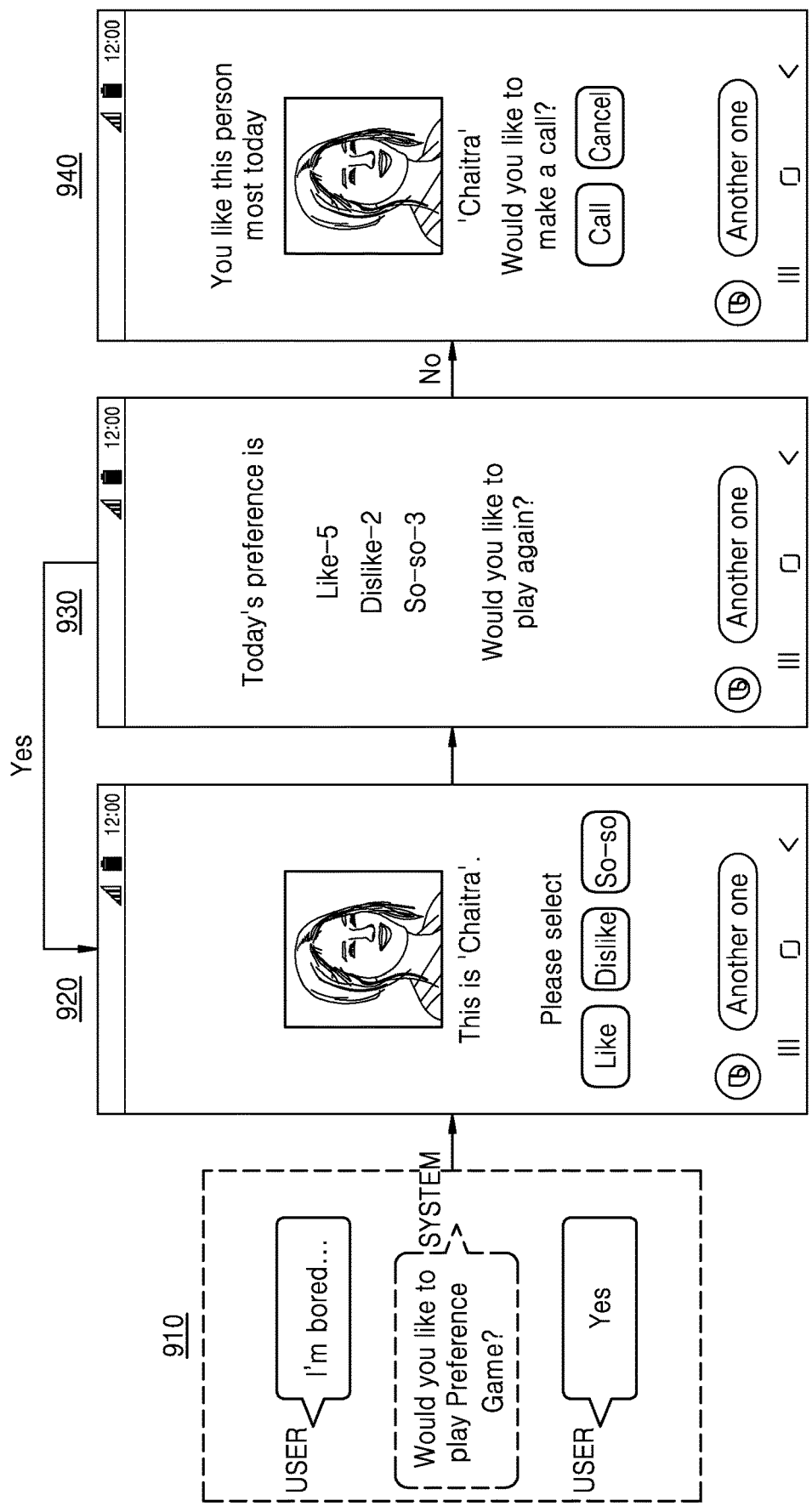
FIG. 9 is a diagram illustrating an example of providing an interactive game related to contact information, according to an embodiment.

FIG. 9 is a diagram illustrating an example of providing an interactive game related to contact information, according to an embodiment.

Referring to FIG. 9, in operation 910, the electronic device 1000 may determine whether to provide an interactive game according to the user's voice input. The electronic device 1000 according to an embodiment may determine the user data type for providing the interactive game based on the user data, and may provide the interactive game based on the determined user data type.

In a case of the determined user data type being "Contact information", the electronic device 1000 according to an embodiment may ask the user whether to execute "Preference game", that is an interactive game related to "Contact information", and provide the user with the interactive game.

The interactive game related to "Contact information" according to an embodiment may be a game in which a user determines a preference for each contact information item.

In operation 920, the electronic device 1000 may generate and output a question and choices for the interactive game according to a user's voice input. The electronic device 1000 according to an embodiment may select a contact information item that is likely to be preferred by the user or attract the user's interest from among data corresponding to "Contact information" of the user data, and generate the question based on the selected contact data item. For example, based on the prediction model for generating a question, features of the contact data may be determined as a question type, and a question that asks for a preference for the contact data item of "Chaitra" among the contact data and choices may be generated based on the determined features.

According to an embodiment, choices "Like", "Dislike", and "So-so" may be generated to be selected by the user.

In operation 930, the electronic device 1000 may output a result of the interactive game upon receipt of the user's response selecting one of the choices "Like", "Dislike", and "So-so". For example, as a result of executing the interactive game several times, preferences to a plurality of contact information items that the user has selected may be displayed on the display.

According to an embodiment, "Preference game" may be re-executed with respect to another contact information item according to the user's selection. According to an embodiment, in a case where the interactive game is re-executed, the interactive game with another question may be executed or the interactive game with respect to another user data type may be executed, according to a user input.

In a case where the interactive game is terminated according to a user input, in operation 940, the electronic device 1000 may suggest an additional operation to the user based on the user's answer selected in operation 920. For example, in a case where the user has selected "Like" for the contact information item of "Chaitra", the electronic device 1000 may suggest an additional operation for making a call to "Chaitra", to the user.

Figure 10:
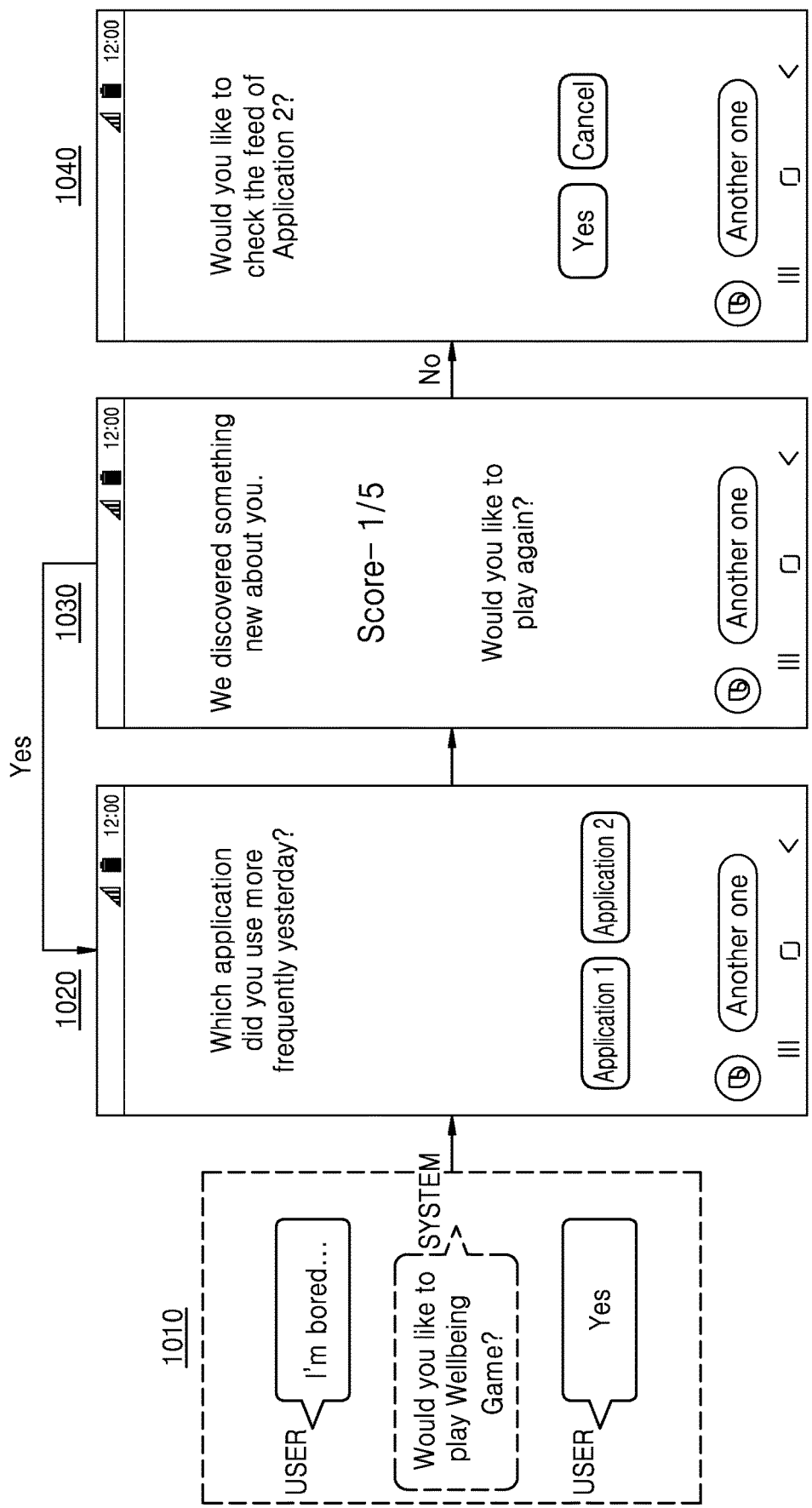
FIG. 10 is a diagram illustrating an example of providing an interactive game related to a history of use of applications, according to an embodiment.

FIG. 10 is a diagram illustrating an example of providing an interactive game related to a history of use of applications, according to an embodiment.

Referring to FIG. 10, in operation 1010, the electronic device 1000 may determine whether to provide an interactive game according to the user's voice input. The electronic device 1000 according to an embodiment may determine the user data type for providing the interactive game based on the user data, and may provide the interactive game based on the determined user data type.

In a case of the determined user data type being "History of use of applications", the electronic device 1000 according to an embodiment may ask the user whether to execute "Wellbeing game", that is an interactive game related to "History of use of applications", and provide the user with the interactive game.

The interactive game related to "History of use of applications" according to an embodiment may be a game that asks for the amount of use of at least one application installed on the electronic device 1000.

In operation 1020, the electronic device 1000 may generate and output a question and choices for the interactive game according to a user's voice input. The electronic device 1000 according to an embodiment may select a piece of data indicating a history of use of at least one application that is likely to be preferred by the user or attract the user's interest from among data corresponding to "History of use of applications" of the user data, and generate the question based on the selected piece of data. For example, according to the question type determined based on the prediction model for generating a question, the electronic device 1000 may determine which application the question is about, and which feature the question asks for, in relation to the amount of use of the application, and the question and the choices may be generated according to the determination.

According to an embodiment, at least one choice may be generated to be selected by the user.

In operation 1030, the electronic device 1000 may output a result of the interactive game upon receipt of the user's response selecting one of choices "Application 1" and "Application 2". For example, as a result of executing the interactive game several times, the number of correct answers that the user has made may be displayed on the display.

According to an embodiment, "Wellbeing game" may be re-executed with respect to another contact information item according to the user's selection. According to an embodiment, in a case where the interactive game is re-executed, the interactive game with another question may be executed or the interactive game with respect to another user data type may be executed, according to a user input.

In a case where the interactive game is terminated according to a user input, in operation 1040, the electronic device 1000 may suggest an additional operation to the user based on the user's answer selected in operation 1020. For example, as the user selects Application 2, the electronic device 1000 may suggest an operation of checking a feed of Application 2 to the user.

Figure 11:
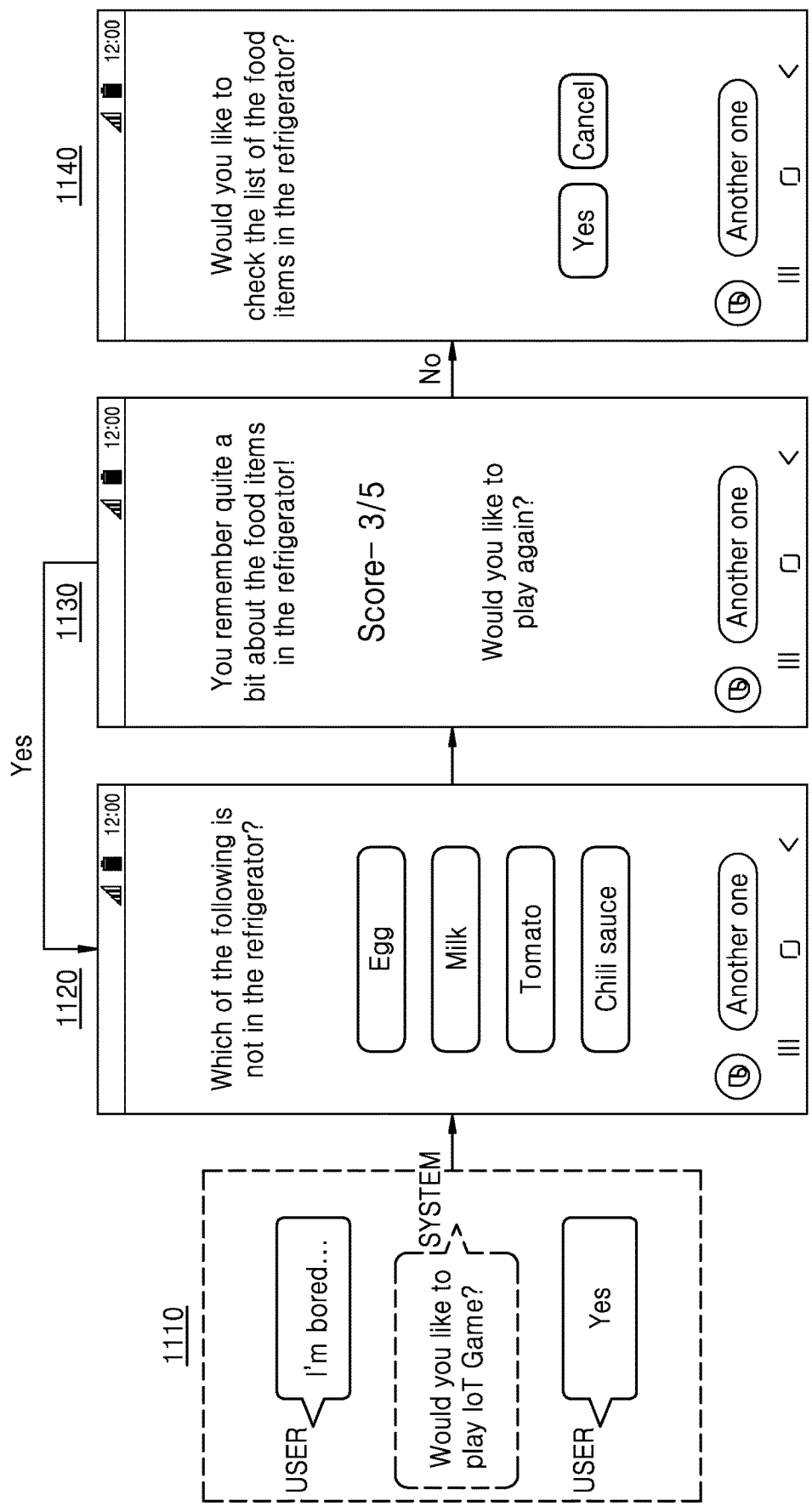
FIG. 11 is a diagram illustrating an example of providing an interactive game related to an IoT device, according to an embodiment.

FIG. 11 is a diagram illustrating an example of providing an interactive game related to an IoT device, according to an embodiment.

Referring to FIG. 11, in operation 1110, the electronic device 1000 may determine whether to provide an interactive game according to the user's voice input. The electronic device 1000 according to an embodiment may determine the user data type for providing the interactive game based on the user data, and may provide the interactive game based on the determined user data type.

In a case of the determined user data type being an "IoT device", the electronic device 1000 according to an embodiment may ask the user whether to execute an "IoT game", that is an interactive game related to the "IoT device", and provide the user with the interactive game.

The interactive game related to the "IoT device" according to an embodiment may be a game that asks for the current state of an IoT device.

In operation 1120, the electronic device 1000 may generate and output a question and choices for the interactive game according to a user's voice input. The electronic device 1000 according to an embodiment may select a piece of data related to the "IoT device" that is likely to be preferred by the user or attract the user's interest from among data corresponding to the "IoT device" of the user data, and generate the question based on the selected piece of data. For example, based on the prediction model for generating a question, the electronic device 1000 may determine which IoT device the question is about, and which feature of the IoT device the question asks for, and the question that asks for the state of the "IoT device" and the choices may be generated according to the determination.

In operation 1130, the electronic device 1000 may output a result of the interactive game upon receipt of the user's response selecting one of choices as illustrated in 1120 of FIG. 11. For example, as a result of executing the interactive game several times, the number of correct answers that the user has made may be displayed on the display.

According to an embodiment, the "IoT game" may be re-executed with respect to another contact information item according to the user's selection. According to an embodiment, in a case where the interactive game is re-executed, the interactive game with another question may be executed or the interactive game with respect to another user data type may be executed, according to a user input.

In a case where the interactive game is terminated according to a user input, in operation 1140, the electronic device 1000 may suggest an additional operation to the user based on the user's answer selected in operation 1120. For example, as the user selects an incorrect choice to the question that asks for a food item that is not in a refrigerator, the electronic device 1000 may suggest, to the user, an operation of displaying a list of food items stored in the refrigerator on the electronic device 1000.

Figure 12:
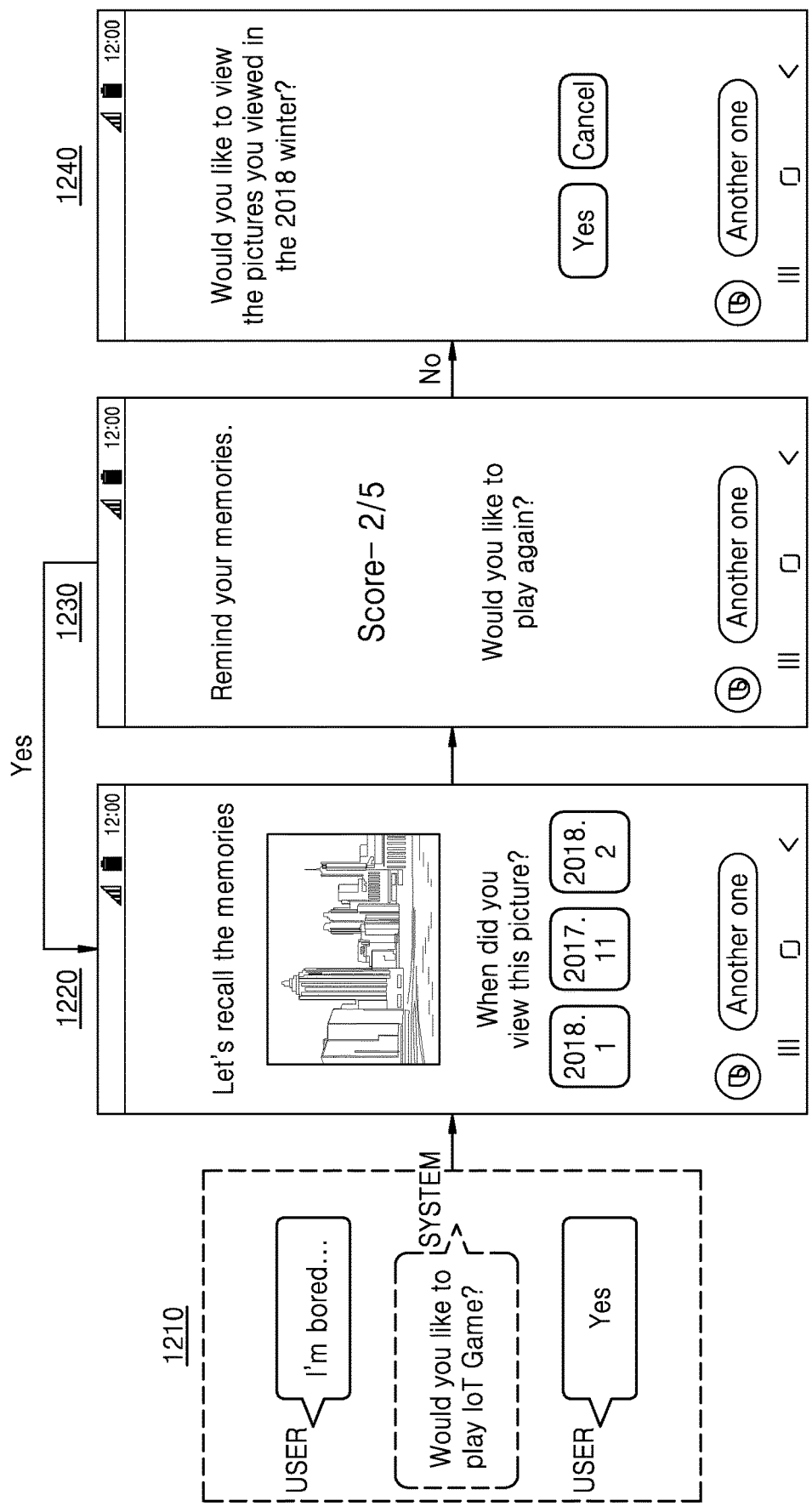
FIG. 12 is a diagram illustrating an example of providing an interactive game related to an image, according to an embodiment.

FIG. 12 is a diagram illustrating an example of providing an interactive game related to an image, according to an embodiment.

Referring to FIG. 12, in operation 1210, the electronic device 1000 may determine whether to provide an interactive game according to the user's voice input. The electronic device 1000 according to an embodiment may determine the user data type for providing the interactive game based on the user data, and may provide the interactive game based on the determined user data type.

In a case of the determined user data type being an "Image", the electronic device 1000 according to an embodiment may ask the user whether to execute a "Memory game", that is an interactive game related to the "Image", and provide the user with the interactive game.

The interactive game related to the "Image" according to an embodiment may be a game that asks for a feature related to the "Image".

In operation 1220, the electronic device 1000 may generate and output a question and choices for the interactive game according to a user's voice input. The electronic device 1000 according to an embodiment may select a piece of data related to the "Image" that is likely to be preferred by the user or attract the user's interest from among data corresponding to the "Image" of the user data, and generate the question based on the selected piece of data. For example, based on the prediction model for generating a question, the electronic device 1000 may determine which image the question is about, and which information of the image the question asks for, and the question that asks for a feature related to the "Image" and the choices may be generated according to the determination.

In operation 1130, the electronic device 1000 may output a result of the interactive game upon receipt of the user's response selecting one of choices as illustrated in 1220. For example, as a result of executing the interactive game several times, the number of correct answers that the user has made may be displayed on the display.

According to an embodiment, "Memory game" may be re-executed with respect to another contact information item according to the user's selection. According to an embodiment, in a case where the interactive game is re-executed, the interactive game with another question may be executed or the interactive game with respect to another user data type may be executed, according to a user input.

In a case where the interactive game is terminated according to a user input, in operation 1240, the electronic device 1000 may suggest an additional operation to the user based on the user's answer selected in operation 1220. For example, as the user selects an incorrect choice to the question that asks for the date the user has opened the image, the electronic device 1000 may suggest, to the user, an operation of displaying images that the user has opened on the date the user selected.

FIG. 13 is a diagram illustrating an example of providing an interactive game related to a location, according to an embodiment.

Referring to FIG. 13, in operation 1310, the electronic device 1000 may determine whether to provide an interactive game according to the user's voice input. The electronic device 1000 according to an embodiment may determine the user data type for providing the interactive game based on the user data, and may provide the interactive game based on the determined user data type.

In a case of the determined user data type being "Location", the electronic device 1000 according to an embodiment may ask the user whether to execute "Map game", that is an interactive game related to "Location", and provide the user with the interactive game.

The interactive game related to "Location" according to an embodiment may be a game that asks for a feature related to "Location" information stored in the electronic device 1000.

In operation 1320, the electronic device 1000 may generate and output a question and choices for the interactive game according to a user's voice input. The electronic device 1000 according to an embodiment may select a piece of data related to "Location" that is likely to be preferred by the user or attract the user's interest from among data corresponding to "Location" of the user data, and generate the question based on the selected piece of data. For example, based on the prediction model for generating a question, the electronic device 1000 may determine which location the question is about, and which information of the location the question asks for, and the question that asks for a feature related to "Location" and the choices may be generated according to the determination.

In operation 1330, the electronic device 1000 may output a result of the interactive game upon receipt of the user's response selecting one of choices as illustrated in 1320 of FIG. 13. For example, as a result of executing the interactive game several times, the number of correct answers that the user has made may be displayed on the display.

According to an embodiment, "Map game" may be re-executed with respect to another contact information item according to the user's selection. According to an embodiment, in a case where the interactive game is re-executed, the interactive game with another question may be executed or the interactive game with respect to another user data type may be executed, according to a user input.

In a case where the interactive game is terminated according to a user input, in operation 1340, the electronic device 1000 may suggest an additional operation to the user based on the user's answer selected in operation 1320. For example, as the user selects an incorrect choice to the question that asks for the store that the user has visited most frequently from among a plurality of stores, the electronic device 1000 may suggest, to the user, an operation of checking information of the store that the user selected.

According to an embodiment, a user-customized interactive game including information that is likely to attract a user's interest may be provided by using user data collected by an electronic device.

A machine-readable storage medium may be provided in a form of a non-transitory storage medium. Here, the term 'non-transitory storage medium' refers to a tangible device and does not include a signal (e.g., an electromagnetic wave), and the term 'non-transitory storage medium' does not distinguish between a case where data is stored in a storage medium semi-permanently and a case where data is stored temporarily. For example, the non-transitory storage medium may include a buffer in which data is temporarily stored.

According to an embodiment, the method according to various embodiments disclosed herein may be included in a computer program product and provided. The computer program product may be traded between a seller and a purchaser as a commodity. The computer program product may be distributed in a form of a machine-readable storage medium (e.g., compact disk read only memory (CD-ROM)), or may be distributed online (e.g., downloaded or uploaded) through an application store (e.g., Google Play™) or directly between two user devices (e.g., smartphones). In the case of online distribution, at least a portion of the computer program product (e.g., a downloadable app) may be temporarily stored in a machine-readable storage medium such as a manufacturer's server, an application store's server, or a memory of a relay server.

In addition, in the specification, the term "unit" may be a hardware component such as a processor or a circuit, and/or a software component executed by a hardware component such as a processor.

While the embodiments of the present disclosure have been particularly shown and described, it will be understood by one of ordinary skill in the art that various changes in form and details may be made therein without departing from the spirit and scope of the present disclosure. Therefore, it should be understood that the above-described embodiments are exemplary in all respects and are not limited. For example, the elements described as single entities may be distributed in implementation, and similarly, the elements described as distributed may be combined in implementation.

The scope of the present disclosure is indicated by the claims which will be described in the following rather than the detailed description, and it should be understood that the claims and all modifications or modified forms drawn from the concept of the claims are included in the scope of the present disclosure.

The invention claimed is:

1. A method, performed by an electronic device, of providing a user with an interactive game, the method comprising:
    obtaining, by at least one processor included in the electronic device, user data collected with respect to the user;
    determining, by the at least one processor, a user data type for providing the interactive game, based on the user data;
    generating, by the at least one processor, a question and choices for the interactive game, based on user data that belongs to the determined user data type, from among the user data; and
    providing, by the at least one processor, the user with the interactive game including the question and the choices via at least one of a display or a speaker,
    wherein at least one of the question or the choices for the interactive game comprises information about at least one piece of the user data, which is determined based on a possibility of each piece of the user data attracting interest of the user, from among the user data that belongs to the determined user data type, and
    wherein the value representing the possibility of each piece of the user data attracting the interest of the user being determined according to a prediction model.

2. The method of claim 1, wherein the question for the interactive game comprises a question that asks the user for thoughts about at least one piece of the user data that belongs to the determined user data type.

3. The method of claim 1, wherein the value representing the possibility of each piece of the user data attracting the interest is determined based on a history of use of at least one piece of the user data, from among the user data that belongs to the determined user data type.

4. The method of claim 1, wherein the value representing the possibility of each piece of the user data attracting the interest is determined based on information related to a behavior pattern of the user that can be determined from at least one piece of the user data, from among the user data that belongs to the determined user data type.

5. The method of claim 1, wherein the choices for the interactive game comprise at least one choice that is determined according to a value representing a probability of the at least one choice being selectable by the user as an answer to the question, based on the user data.

6. The method of claim 1, further comprising performing, by the at least one processor, an operation related to the user data, based on at least one choice selected by the user, from among the choices for the interactive game.

7. An electronic device for providing a user with an interactive game, the electronic device comprising:
    a user input interface configured to receive a user input for providing the interactive game;
    at least one processor configured to:
        obtain, in response to the user input being received, user data collected with respect to the user,
        determine a user data type for providing the interactive game, based on the user data, and
        generate a question and choices for the interactive game, based on user data that belongs to the determined user data type; and
    at least one of a display or a speaker configured to provide the user with the interactive game including the question and the choices,
    wherein at least one of the question or the choices for the interactive game comprises information about at least one piece of the user data, which is determined based on a value representing a possibility of each piece of the user data attracting interest of the user, from among the user data that belongs to the determined user data type, and
    wherein the value representing the possibility of each piece of the user data attracting the interest of the user being determined according to a prediction model.

8. The electronic device of claim 7, wherein the question for the interactive game comprises a question that asks the user for thoughts about at least one piece of the user data that belongs to the determined user data type.

9. The electronic device of claim 7, wherein the value representing the possibility of each piece of the user data attracting the interest is determined based on a history of use of at least one piece of the user data, from among the user data that belongs to the determined user data type.

10. The electronic device of claim 7, wherein the value representing the possibility of each piece of the user data attracting the interest is determined based on information related to a behavior pattern of the user that can be determined from at least one piece of the user data, from among the user data that belongs to the determined user data type.

11. The electronic device of claim 7, wherein the choices for the interactive game comprise at least one choice that is determined according to a value representing a probability of the at least one choice being selectable by the user as an answer to the question, based on the user data.

12. The electronic device of claim 7, wherein the at least one processor is further configured to perform an operation related to the user data, based on at least one choice selected by the user, from among the choices for the interactive game.

13. A computer program product comprising a non-transitory computer-readable storage medium configured to store one or more computer programs including instructions that, when executed by at least one processor, cause the at least one processor to:

obtain user data collected with respect to the user, determine a user data type for providing an interactive game, based on the user data, generate a question and choices for the interactive game, based on user data that belongs to the determined user data type, from among the user data, and provide the user with the interactive game including the question and the choices via at least one of a display or a speaker, wherein at least one of the question or the choices for the interactive game comprises information about at least one piece of the user data, which is determined based on a possibility of each piece of the user data attracting interest of the user, from among the user data that belongs to the determined user data type, and wherein the value representing the possibility of each piece of the user data attracting the interest of the user being determined according to a prediction model.

14. The computer program product of claim 13, wherein the question for the interactive game comprises a question that asks the user for thoughts about at least one piece of the user data that belongs to the determined user data type.

15. The computer program product of claim 13, wherein the value representing the possibility of each piece of the user data attracting the interest is determined based on a history of use of at least one piece of the user data, from among the user data that belongs to the determined user data type.

16. The computer program product of claim 13, wherein the value representing the possibility of each piece of the user data attracting the interest is determined based on information related to a behavior pattern of the user that can be determined from at least one piece of the user data, from among the user data that belongs to the determined user data type.

17. The computer program product of claim 13, wherein the choices for the interactive game comprise at least one choice that is determined according to a value representing a probability of the at least one choice being selectable by the user as an answer to the question, based on the user data.

18. The computer program product of claim 13, wherein the at least one processor is further configured to perform an operation related to the user data, based on at least one choice selected by the user, from among the choices for the interactive game.

* * * * *